United States Patent
Becroft (10) Patent No.: US 11,300,226 B2
(45) Date of Patent: Apr. 12, 2022

(54) FAUCET WITH SAFETY INTERLOCK FOR NEAR-BOILING AND CHILLED WATER

(71) Applicant: Aquatica NZ Limited, Auckland (NZ)

(72) Inventor: Leonard Forsdick Becroft, Auckland (NZ)

(73) Assignee: AQUATICA NZ LIMITED, Auckland (NZ)

( * ) Notice: Subject to any disclaimer, the term of this patent is extended or adjusted under 35 U.S.C. 154(b) by 7 days.

(21) Appl. No.: 16/433,922

(22) Filed: Jun. 6, 2019

(65) Prior Publication Data

US 2019/0376615 A1    Dec. 12, 2019

(30) Foreign Application Priority Data

Jun. 6, 2018 (AU) .............................. 2018902037

(51) Int. Cl.
    *F16K 35/02* (2006.01)
    *E03C 1/04* (2006.01)

(52) U.S. Cl.
    CPC ............ *F16K 35/027* (2013.01); *E03C 1/041* (2013.01); *E03C 1/0411* (2013.01)

(58) Field of Classification Search
    CPC ...... E03C 1/041; E03C 1/0411; E03C 1/0412; F16K 35/02; F16K 35/027
    See application file for complete search history.

(56) References Cited

U.S. PATENT DOCUMENTS

| 4,549,716 A | * | 10/1985 | Warren | .................. F16K 31/60 |
| | | | | 192/69.91 |
| 5,417,348 A | * | 5/1995 | Perrin | .................. B67D 1/0059 |
| | | | | 137/606 |
| 5,490,660 A | * | 2/1996 | Kamezawa | ........... F16K 35/027 |
| | | | | 251/96 |
| 2006/0130908 A1 | | 6/2006 | Marty et al. | |
| 2009/0114036 A1 | | 5/2009 | Dhulipudi et al. | |

FOREIGN PATENT DOCUMENTS

| CN | 207018575 | 2/2018 |
| CN | 207064270 | 3/2018 |
| EP | 2212603 | 8/2010 |
| JP | 2007-051757 | 3/2007 |
| WO | WO2019060951 | 4/2019 |

* cited by examiner

*Primary Examiner* — Erin Deery
(74) *Attorney, Agent, or Firm* — Nixon & Vanderhye (57) ABSTRACT

A two-way or four-way water faucet dispenses near-boiling water on demand but has a safety interlock. A control valve assembly is attached to the faucet. The interlock uses two disks pressed into contact, each having a single projecting sector. One disk is fixed to the valve body. The other disk, fixed to the handle, slides against the first. The disks must be pulled apart by sliding the handle while it is being turned to superimpose the sectors and turn the control valve, connecting the faucet to the vented near-boiling water supply. A reed switch inside the fixed sector is activated by a magnet inside the rotatable sector and activates a near-boiling water pump.

19 Claims, 4 Drawing Sheets

FAUCET WITH SAFETY INTERLOCK FOR NEAR-BOILING AND CHILLED WATER

FIELD

This invention relates to improvements in respect of faucets; and to faucets having multiple supplies of water; more particularly to domestic faucets capable of handling water at or near a boiling temperature together with water at other temperatures. In an alternative, this invention relates to improvements that protect users when operating faucets or valves carrying hazardous materials such as near-boiling water.

DEFINITIONS

'Abrupt" in this document describes a change in height between one sector of a safety interlock disk and another sector as being an immediate change in height—such that there is a perpendicular step.

'Faucet' in this document is a general name for a multi-way or multiple-inlet mixer faucet and refers to a water valve that dispenses water from a spout. A domestic application is likely. In this application, water is to be dispensed at one of a range of temperatures.

'Near-boiling' is a term to describe water in the vicinity of a temperature of 85-95° C.; preferably 91° C. (where the boiling point is 100° C. under standard conditions).

PTFE is an acronym for polytetrafluoroethylene, a plastics material. (example: Teflon®)

Reference directions used herein: "an inward" or "a medial aspect" or "medially" is a direction along a control assembly on a side of a faucet toward an axis of the inner faucet body and "an outward" or "a lateral aspect" or "laterally" is a direction along a lateral axis away from the axis of the faucet body.

BACKGROUND

Mixer faucets which provide a flow of water from two supplies reticulated about a dwelling; for example hot water at a temperature of perhaps 60-70° C. and cold water at a temperature of perhaps 10-25° C. are well-known. A lever type of hand control can be rotated for temperature and tilted for flow rate from a spout. Such mixer faucets are not usually required to have safety additions.

A typical prior-art hot-and-cold input bench-mounted mixer faucet with a side control lever includes a controllable mixing cartridge which mixes two supplies received from pipes led into a faucet body. Separate pipes carrying water at the two temperatures are taken from an under-bench origin through an inner body or manifold. The flow is diverted to the side of the inner body at two non-rotating apertures or ports at defined positions upon a first flat circular surface, corresponding to entry ports within a control cartridge mixing assembly. Inside the control cartridge there is a rotatable array of waterways or channels made within an end of a cylindrical component designed to effect a controlled admission of water of each temperature at a desired ratio, depending on the amount of rotation of the array, to an output port. The output port of the control cartridge is aligned with an aperture in the inner body The cartridge is disposed to return the mixed supply to the faucet body for conveying to a faucet spout.

Materials used in the prior art are typically brass or other corrosion-free metal, 'O' ring seals, and cylindrical silicone or nitrile rubber resilient rubber seals in the sealing disk within the mixing control cartridge, while the waterways are formed into a ceramic surface A cylinder construction is a convenient way to press the non-rotating and the rotating parts against each other using locating pins to prevent rotation, with a threaded collar screwed into a threaded hole in the mixer faucet housing, while allowing a rotatable control to alter flow.

Control valves including a safety element are known in the domestic environment, such as the combined gas control and ignitor switch valves on a variety of gas cookers. The present application incorporates a version of a safety control valve to control a supply of near-boiling water in a faucet, especially but not necessarily one that can also provide water at other temperatures.

Problems to be Solved

It would be useful, and economical of time and energy, to provide a person with a faucet on a domestic kitchen bench providing near-instant, near-boiling water as such or for making infusion-based drinks such as tea or coffee, and alternatively chilled water as such, or for mixing with fruit juices or other beverages. As an option, it would be more useful if such functions in the same dimensions as use by existing two-way mixer faucet. Further, combination of an existing two-way mixer faucet and a near-boiling or chilled water faucet upon a single footprint; as a four input faucet would be useful. The prior art has limitations; some of which are discussed below.

A first problem relates to providing an internal safety interlock mechanism to avoid inadvertent release of near-boiling water from the spout. A child-resistant control that functions with ease is required. Some mechanisms for that purpose are easily damaged by hand-applied force.

A second problem relates to safely holding an amount of water at a near-boiling temperature ready to be dispensed through the faucet on demand Both common sense and safety regulations indicate that an adjacent water heater or boiler shall be held at or near atmospheric pressure, by being vented to the atmosphere, not held at the pressure of the supply mains. Direct access by a valve to the output of a pressurised boiler is likely to lead to spurting from gas that came out of solution on heating and also immediately on release of pressure. The resulting spillage is likely to cause injury and accidents.

A third problem is that passage of even moderate amount of near-boiling water through a faucet or spout or through a control valve may heat up the surrounding metal to beyond temperatures capable of causing pain and trauma by skin contact, for which the threshold is generally taken as being at 52° C. The user may not realise that the faucet is at a dangerous temperature.

Review of Prior Art

Descriptions of faucets capable of dispensing near-boiling and chilled water include:
  a. Yueija Sanitary Ware (Jiangmen) Co. Ltd as CN 207064270 for a multi-input faucet with capability for near-boiling water, having a hand control.
  b. WO2019/060951 Kop, to XPRS Systems Pty Ltd discloses a heated and chilled water dispenser with support heating, chilling and filtering apparatus.

Faucets of that type having switches for sensing position of control levers are described in:
  a. EP2212603; a faucet having a movement-responsive reed switch that starts a water heater.

b. Xiamen Lishui Technology Co. Ltd, as CN207018575; a multi-input faucet and capability for cold, hot and near-boiling water, also having a safety button to release the near-boiling water.

c. JP 2007051757 Hasagewa provides a safety control intended to prevent a boiling water accident or the like, using a spring-loaded projecting finger within a control housing.

d. US2006130908; an electronic faucet in which motion of a joystick control is sensed by magnetically operated switches such as reed switches.

Desirable Outcomes of the Invention

To provide a multi-function faucet for safely dispensing water at various controlled temperatures including a near-boiling temperature. One particular outcome is to provide a stand-alone mixer faucet for safe dispensing of near-boiling and chilled water, and another particular object is to provide a stand-alone mixer faucet for safe dispensing of near-boiling and chilled water in addition to providing mixed hot water and cold water. Another outcome is to provide apparatus having an exterior that does not get hot, and yet another outcome is to provide the public with an alternative choice of water faucets

SUMMARY OF THE INVENTION

In a first broad aspect the invention provides a safety interlock for a rotatable shaft of a hand-operated rotary valve or non-mixing control cartridge having a laterally directed axis with an inward or medial aspect toward a body of a tap or faucet and an outward or lateral aspect away from the body; the safety interlock having the purpose of guarding delivery of a flow of water through the non-mixing control cartridge at a near-boiling temperature, characterised in that the non-mixing control cartridge is coaxial with the laterally directed axis and has a rotatable laterally projecting control shaft provided with longitudinal splines and supporting a rotatable and slidably movable user-operated cylindrical handle with the splines; the handle being biased toward a medial direction by a biasing spring;

a first disk of the safety interlock being coaxially fixed against a lateral side of the non-mixing control cartridge, surrounding the splined control shaft and having a lateral disk surface including a raised first sector extending through a greater arc and having abruptly raised ends;

a second disk of the safety interlock being coaxially fixed against a medial surface of the cylindrical handle and having a medial disk surface including a raised second sector extending through a lesser arc and having abruptly raised ends; said second disk having an internal splined aperture slidably supporting the handle along the splined control shaft while maintaining engagement at a predetermined angular position around the splined control shaft; said second disk being biased toward a medial direction and maintaining slidable contact against the first disk;

the predetermined angular position provides that when the first sector and the second sector are in a superimposed position the shaft of the non-mixing control cartridge is at an angular position providing opened internal channels connecting an entry port of the control cartridge designated for near-boiling water to an exit port;

but when in use the control shaft is prevented from rotation into the superimposed position by collision of adjacent ends of the first sector of the first disk and the second sector of the second disk, unless the user pulls the handle along the splines of the shaft laterally against the bias, thereby separating the first and second disk and lifting the edge of the second sector over the edge of the first sector and then turns the handle by a further amount so that the superimposed position may be reached.

Preferably the near-boiling water is maintained at a temperature range of 85 to 95° C.; preferably 91° C. in an adjacent container.

Preferably the first disk has a raised first sector extending through an arc of about 180 degrees and the second disk has a raised second sector extending through an arc of about 90 degrees.

Preferably the laterally directed, raised sector of the first disk includes a first proximity switch responsive to a magnetic field, and the medially directed, raised sector of the second disk includes a permanent magnet having a magnetic field effective on the proximity switch so that, when in use, attainment of the superimposed position causes the first proximity switch to change state, thereby providing electrical sensing of the superimposed position capable of use by a second part of the safety interlock.

In a second related aspect the invention provides a two-way bench-top tap or faucet having a delivery spout and including the non-mixing control cartridge and safety interlock as previously described in this section attached to the tap at a first side aperture; characterised in that the tap is supplied with a flow of near-boiling water and with a flow of chilled water at respective connectors into channels of an inner tap body or manifold for controllable delivery of water of either temperature from the delivery spout under user control of the hand-operated non-mixing control cartridge; the rotatable and slidably movable cylindrical handle has a first or "off" middle angular position in which the control cartridge does not allow water to flow; a second or "near-boiling" angular position reached by rotation of the cylindrical handle in a first direction but after overcoming the safety interlock, in which a first set of channels within the control cartridge connect between a source of near-boiling water carried by the inner tap body and the delivery spout, and a third or "chilled" angular position reached by rotation of the cylindrical handle from the first position in an opposite direction, in which a second set of channels within the control cartridge are connected between a source of chilled water carried by the inner tap body and the delivery spout.

In a third related aspect, a second proximity switch responsive to the permanent magnet within the raised sector of the second disk is located within the first disk and angularly disposed in order to change state when the hand control is in the third or "chilled" position and is connected to a second set of connected wiring.

Preferably, the tap is supplied with a flow of near-boiling water and a flow of chilled water and a flow of reticulated hot water and a flow of reticulated cold water and is also provided with a second hand-operated mixer cartridge assembly attached to the tap at a second side aperture capable in use of dispensing on demand from the spout a flow of reticulated hot water and cold water supplies mixed in any proportion under control of a second hand-operated lever coupled to the mixer cartridge; the tap having a tap body and an inner tap body or manifold including channels connecting the flow of reticulated hot water and the flow of reticulated cold water to the mixer control cartridge; said inner tap body also carrying a mixed output from the mixer control cartridge to the spout.

Preferably, wiring from the first proximity switch is connected to a relay or supply circuit configured to provide electric power to an electrically driven device selected from the range of pumps or solenoid-controlled valves capable in use of drawing or supplying a flow of near-boiling water to the tap from a container holding water maintained at a near-boiling temperature thereby preventing delivery of the near-boiling water to the tap unless (a) the first and second sectors of the disks have been superimposed, and (b) as a result, the first proximity switch has changed state.

Notably, use of a vented boiler beneath the bench bearing the tap requires active pumping. Preferably the vented container receives water through a level-sensitive inlet valve equivalent to a float valve.

Preferably, wiring from the second proximity switch is connected to a second relay or supply circuit configured to provide electric power to an electrically driven device selected from the range of pumps or solenoid-controlled valves capable in use of drawing or supplying a flow of chilled water to the tap from a container holding water maintained at a chilled temperature.

Alternatively the wiring arising from the first proximity switch is interruptible by an external security switch as an additional safety precaution.

In a fourth aspect, selected plastics materials are substituted for thermally conductive materials and materials having a limited life when used with water at near-boiling temperatures; said plastics materials include use of PTFE as the inner body, serving as thermal isolation for internal water channels that, when in use, may contain near-boiling water inside the tap body; so that when in use the body and spout of the tap are not heated to dangerous temperatures by the near-boiling water.

Optionally, the tap uses cylindrical seals comprised of PTFE within a seal-carrying plate located in between the inner body of the faucet or tap and a perforated ceramic plate within the control cartridge.

DRAWINGS OF PREFERRED EMBODIMENTS

The descriptions of the invention to be provided herein assume a person skilled in relation to design and construction of domestic mixer faucets.

The descriptions and drawings are given by way of example. They are not to be taken in any way as limiting the scope or extent of the invention. The invention has been described in an illustrative manner, and it is to be understood that the terminology which has been used is intended to be in the nature of words of description rather than of limitation. Reference numerals are provided for clarification only and are not intended to restrict the scope of the invention.

Each document, reference, patent application or patent cited in this text is expressly incorporated herein in their entirety by reference. Reference to cited material or information cited in the text should not be understood as a concession that the material or information was part of the common general knowledge or was known in New Zealand or in any other country. Additional and further aspects of the present invention will be apparent to the reader from the following descriptions of example embodiments, with reference to the accompanying drawings in which:

FIG. 3 as FIGS. 3a and 3b show under-bench support apparatus including a water heater and a pump.

FIG. 4 as FIGS. 4a and 4b depict face views of the mechanical interlock disks (117 and 104) including a reed switch and a magnet combination for obtaining near-boiling water.

BEST MODES FOR CARRYING OUT THE INVENTION

Although the invention may be considered as a stand-alone safety mechanism preventing a rotary valve from being turned to a particular angle unless the user also pulls the handle, the invention is described in detail in an application as part of a two-way beverage-supplying faucet (Example 1) and as a part of a four-way mixer faucet (Example 3).

Example 1

This is a two-stage safety interlock within a chilled/near-boiling bench-top faucet that has a chilled water supply and a near-boiling water supply. Please note that, although the Example refers to a dual supply, including chilled water as well as the guarded or protected supply of near-boiling water, the invention is applicable to a faucet that provides a near-boiling supply, only.

Figure 1:
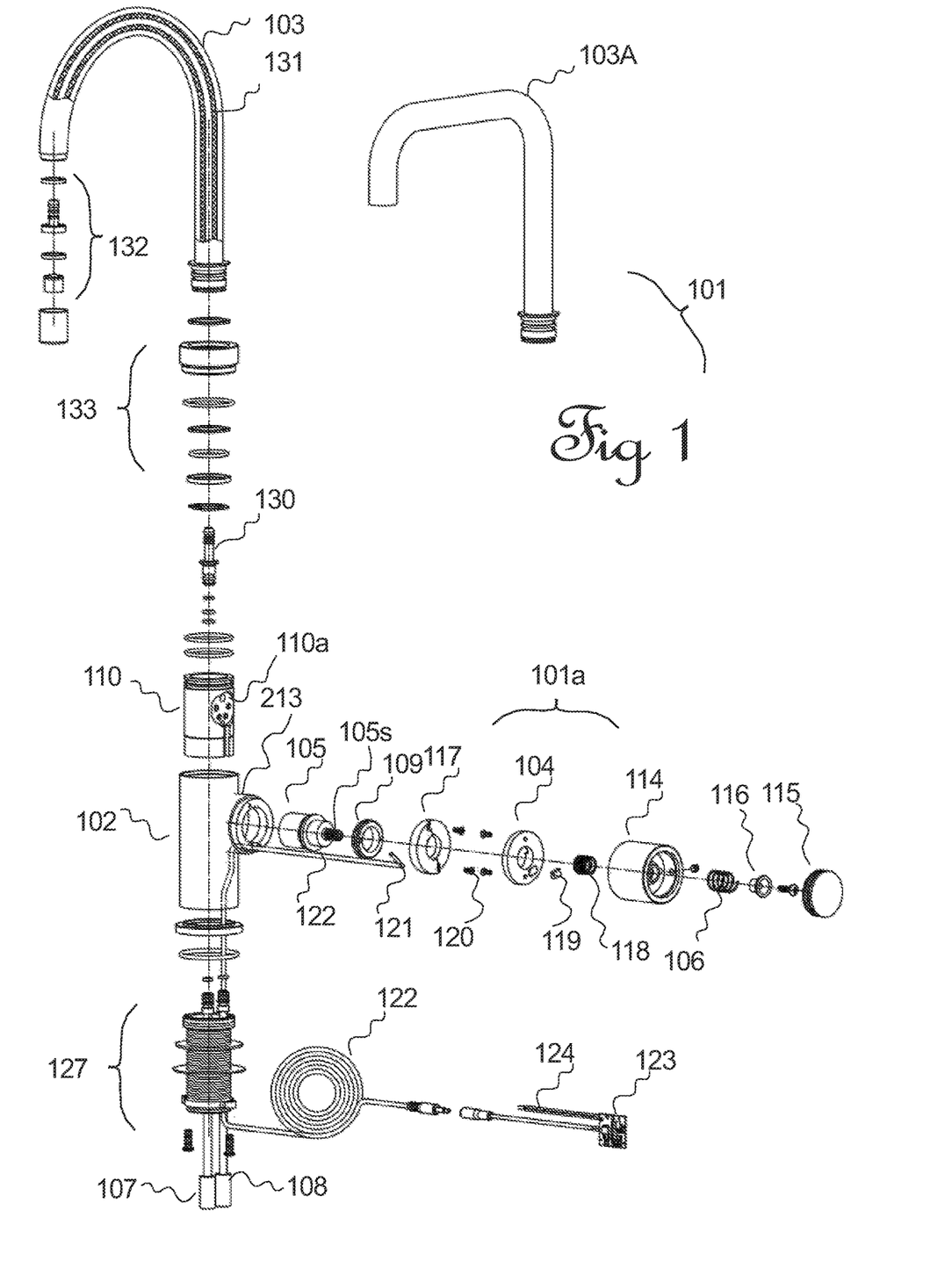
FIG. 1 is an exploded perspective view of a two-way boiling-or-chilled tap according to a first embodiment of the present invention.

FIG. 1 indicates the faucet apparatus in general as 101. Here, 103A simply shows an alternative shape for the spout 103. The drawing is an "exploded perspective view" in which components of the control assembly 101a, extended to the right are separated along a lateral axis line so that they can be seen individually. When assembled the total length is not much greater than the length of the handle itself. The control assembly includes a valve (the non-mixing control cartridge), a safety interlock, a biasing device and a cylindrical handle. The non-mixing control cartridge 105 passes chilled water, near-boiling water, or none to the spout. The apparatus shown in FIG. 1 includes safety interlock parts 104 and 117 on the control assembly which ensure that near-boiling water cannot be delivered unless the user who has grasped cylinder 114 turns the handle, pulls the handle to overcome the stop, and turns the handle some more, as far as is required for a desired flow rate. That adds an intended degree of difficulty to the operation of turning on a tap, so protecting the user from exposure to near-boiling water. Note that similar safety precautions need not be applied to delivery of a chilled water supply although a pump may be activated in a similar electrical way (see below) if the chilled water source is fed from a vented reservoir perhaps replenished with a float valve but is not provided at a pressure, as in FIG. 3b.

A support or supply apparatus will be described in Example 2 with reference to FIGS. 3a and 3b. At the least, the preferred support apparatus is a device to bring near-boiling water to the interior of the faucet on closure of an electric switch 121 or the like inside the faucet. An actuator such as a pump 340 for a vented boiler, or a solenoid valve (not shown) for a supply under pressure is used to acquire the water.

A spout 103 at top left (or an option 103A) is mounted using conventional nuts and washers 133 on a top aspect of an outer body 102. The spout is terminated by a shared conventional aerator assembly 132. The spout 103 or 103A contains a separate conduit for near-boiling water; the plastics tube 131, arising from outlet 130. The plastics tube acts as a thermal barrier, in accordance with the desirable outcome of providing apparatus having an exterior that stays cool. Chilled water and conventional mixed water passes through a space between the tube 131 and the wall of the spout itself. The arrangement minimising a risk of burns from contact with the spout if heated by water at a high temperature.

The faucet body 102 is mounted on to a flat surface such as a bench top by an assembly of washers and threaded large-bore cylindrical nuts—the array 127—according to methods well-known to those skilled in the art. Inside body 102 there is an inner faucet body 110 that serves to provide waterways to and from the control cartridge 105 that is fixedly and sealably held in a side aperture 213. The exposed end of the cartridge is held against the faucet body 102 by a threaded top cap nut 109 engaged with a thread (not shown) about the side aperture 213 of the tap body 102. The inner body is a tight fit inside the outer body 211, assisted by use of an O-ring around the circumference of the inner body. The inner body comprises a cylinder including channels. In accordance with the desirable outcome of providing apparatus having an exterior that stays cool, the inner body is preferably comprised of PTFE or another machinable plastics, to provide thermal insulation for the channels that carry near-boiling water, when in use. It has been found that use of a conventional brass part for the inner body will cause the faucet body to become unacceptably, even dangerously hot, in use. The drilled channels of inner body 110 each accepts a pipe fitting for either supply pipe 107 or supply pipe 108, passing upwards and then out to the side, to a flat connection face 110*a*. From the top and rotating in a clockwise direction body 110 has sockets or ports as follows:

1. A larger blind socket to accept a polarised locating pin on a mating end of a seal-holding disk fixed to a flow end of cartridge 105.
2. A chilled water outlet to spout aperture to mate to a resilient annular seal that is carried in the seal-holding disk.
3. A chilled water inlet from a supply, to mate to a resilient annular seal that is carried in a seal-holding disk fixed to a flow end of an end of control cartridge 105.
4. A smaller blind socket to accept a smaller locating pin on a mating end of the non-rotatable sealing disk.
5. A near-boiling water inlet from a supply to an aperture to mate to a resilient annular seal that is carried in the seal-holding disk.
6. A near-boiling water outlet to a spout connector 130 through an aperture to mate to a resilient annular seal that is carried in the seal-holding disk.

Figure 5:
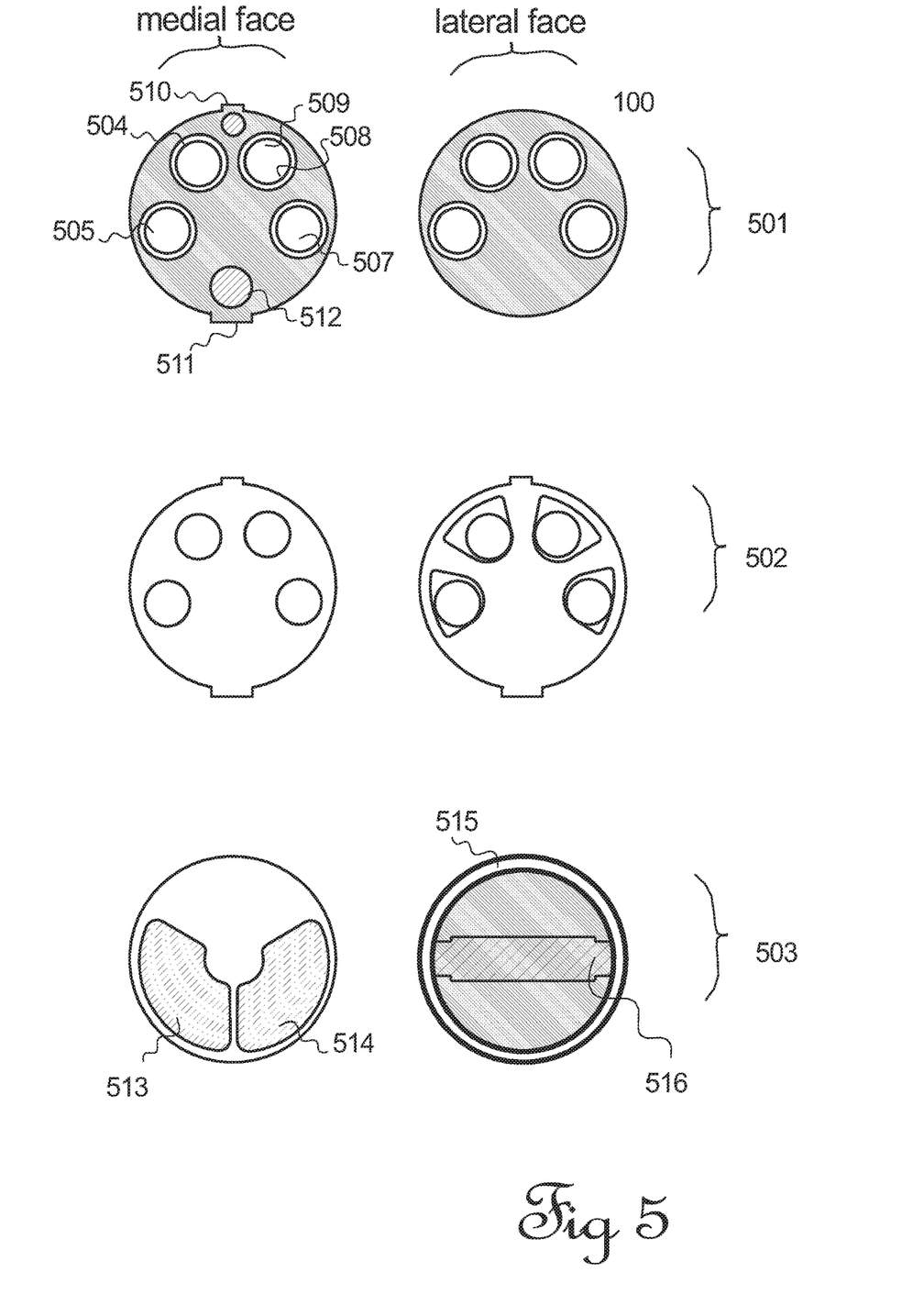
FIG. 5 depicts some components of a non-mixing control cartridge assembly.

Please refer to FIG. 5 which shows the three stacked water channel components of the control cartridge 105 in separated view, showing both the medial face (left column) and the lateral face (right column) of the parts. 501 is a seal-bearing plate in which two inlet channels (below) and two outlet channels (above) pass through a plastics plate. Each channel is sealed with an annulus 508 of PTFE that protrudes from each face and is sealably pressed against adjacent faces by tightening the threaded washer 109 engaged with a thread within the side housing 213. The medial face of plate 501 fits snugly against the six sockets or ports of inner body 110 as described above. Thus, channel 504 is the near-boiling channel to the spout, channel 505 is the near-boiling channel from the tank, channel 507 is the chilled water channel to the spout, channel 509 is the chilled channel from the chiller tank, 508 is a seal, 510 indicates a smaller polarised locating extension or key, and 511 is the smaller locating key. This plate prevents the body of the control cartridge from rotating because, along with the locating pins, its keys 510 and 511 fit into slots within the body of the cartridge. The lateral face is unremarkable. It forms sealing connections with a non-rotatable ceramic wear plate 502 also having locating keys, held tightly against a rotatable ceramic channel plate 503, with the aid of viscous grease. The ceramic wear plate may include chamfered apertures as shown, in order to avoid turbulent flow. The rotatable channel plate 503 is shown in the "off" position. Indentations 513 and 514 will carry water at a variable rate from one channel to another if the channel plate is turned so that one indentation bridges two channels. A mechanical stop (not shown) prevents turning beyond about 50 degree limits to prevent inadvertent cross-connections. The lateral face of the channel plate 503 includes a slot recess 516 that accepts an extension (not shown) from the splined shaft of the control cartridge.

The control handle is a cylinder or cylinder 114 terminated by a control handle cap 115 which may also provide external indicia. In use, the cylinder 114 will be grasped, pulled away from the spout and turned clockwise (as seen from the free end) in order to start a flow of near-boiling water. The exposed end of the cartridge is held against the faucet body 102 by a threaded top cap nut 109 engaged with a thread (not shown) about the side aperture 213 of the faucet body 102. The splined shaft 105*s* of the control cartridge 105 protrudes and, when assembled, passes through the splined aperture of the spline adaptor 118. A threaded socket at the end of the splined shaft receives a screw, washer 116 and end cap 115. An axially mounted compression spring 106 is pressed between the end cap and the lateral side of the cylinder 114 to serve as a resilient object pressing on to cylinder 114 with a force to be overcome when a user wants to operate a safety interlock and obtain near-boiling mode water.

A support or supply apparatus will be described in Example 2 with reference to FIGS. 3*a* and 3*b*. At the least, the preferred support apparatus is a device to bring near-boiling water to the interior of the faucet in event of closure of an electric switch 121 or the like inside the faucet. An actuator such as a pump 340 for a vented boiler, or a solenoid valve (not shown) for a supply under pressure is used to acquire the water.

The mechanical part of the safety interlock comprises two disk-like preferably non-magnetic parts that are placed lateral to the control cartridge; disk 104 which in use is mounted inside the cylinder 114, and disk 117. These parts are also shown in adjacent face view in FIGS. 4*a* and 4*b*. Disk 117 is screwed to the tap body by screws 120, hence does not rotate during use. A unhatched sector 117*a* of disk 117 is abruptly raised by about 4 mm over about 180 degrees of rotation above the remainder of the face 117*b*, which is shown hatched. Both the raised sector and the lower sector are smooth and allow a raised sector 104*b* of disk 104, which is biased or pressed against disk 117 by axial spring 106 after assembly, to slide over disk 117. The splined shaft 105*s* extended laterally from the control cartridge 105 passes through the internal aperture 122 of disk 117 without engagement.

Figure 3A:
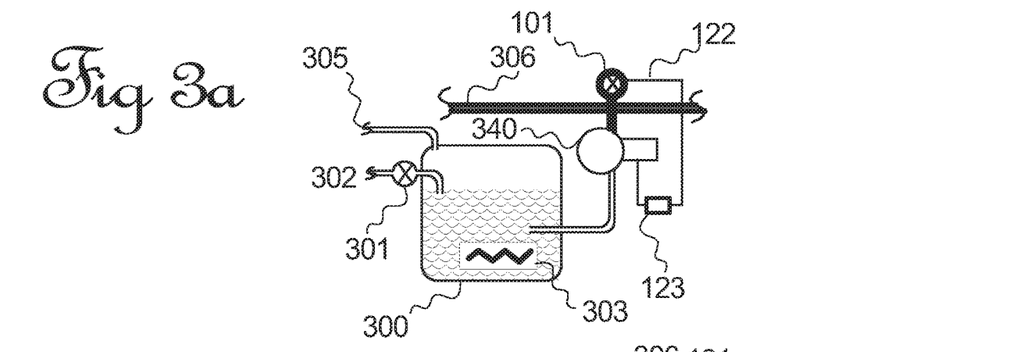
Figure 3B:
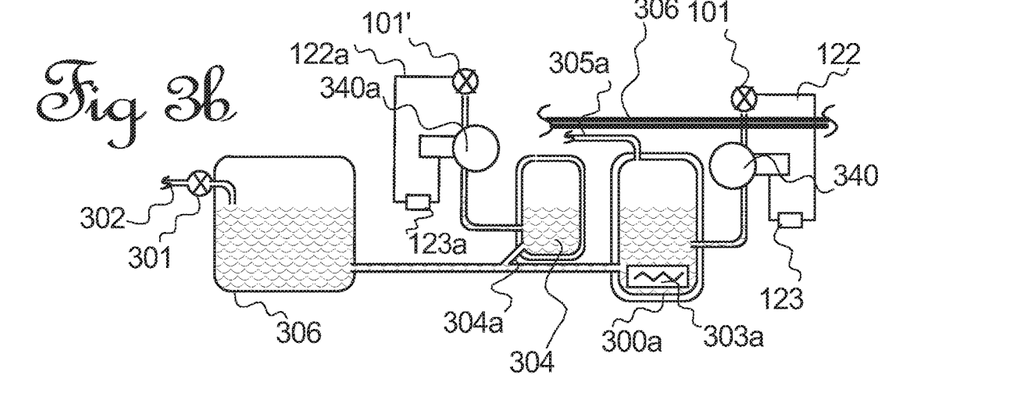

Introduction of an electric switch complements the purely mechanical safety lock previously described in this section by controlling the delivery of water to the respective inputs of the faucet from a compatible support or supply apparatus, described in Example 2 with reference to FIGS. 3*a* and 3*b*. A simple support apparatus is a device to bring near-boiling water to the interior of the faucet in event of closure of an electric switch 121 or the like inside the faucet. An actuator such as a pump 340 for drawing water from a vented boiler, or a solenoid valve (not shown) for connection to a supply under pressure is used to acquire the water.

The concept is to detect a state of "superimposition" of the raised portions of the two disks using a form of proximity sensor; and only if that state exists can near-boiling water be supplied.

Figure 4A:
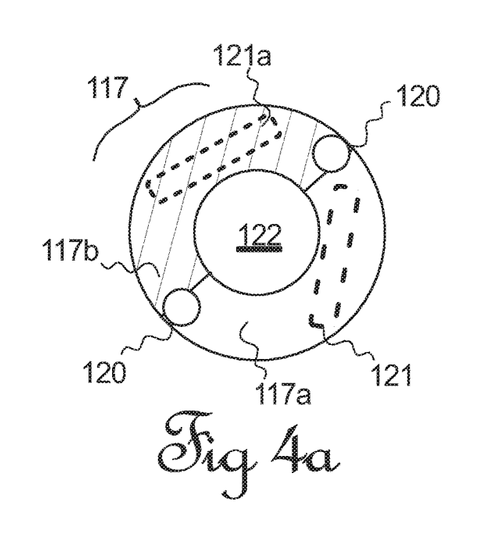
Figure 4B:
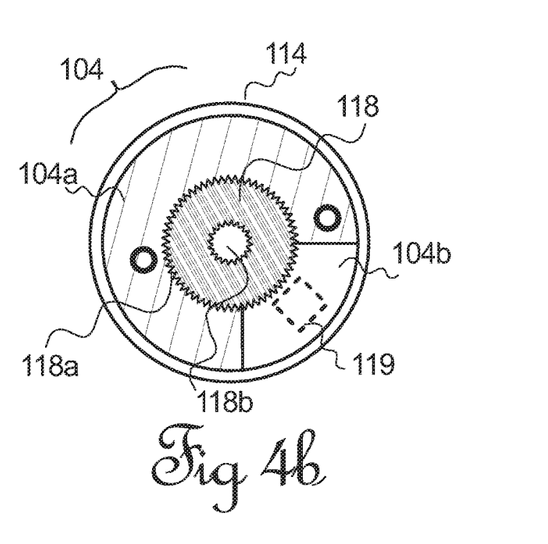

FIG. 4b shows the medial face of disk 104 fixed within the cylindrical handle 114 by screws so that it moves with the cylinder. An unhatched sector 104b is raised by about 4 mm and extends over about 90 degrees of rotation, as shown. That sector is pressed against disk 117 by spring 106. The raised sector conceals a selected permanent magnet 119 used to activate the or each reed switch 121; 121a. Preferred magnets are small and have a strong but localised magnetic field. Disk 104 has a central splined aperture 118a fixed during assembly or maintenance to an optional cylindrical spline adaptor 118 (shown with denser hatching) having an internal splined aperture 118b having about 20 splines that slidably mate with the splines on shaft 105a of the control cartridge, so that, during use, the desired amount of twist can be applied by the user to the control cartridge 105 while cylinder 114 may at the same time be pulled laterally. The cylinder 114 maintains a grip through disk 104 on the splined control cartridge shaft. The spline adaptor has a greater number, perhaps 60 of external splines 118a. The adaptor is fixed during assembly to cylinder 114 by its external splines at an angle that matches the amount of turn of the shaft of the control cartridge for passage of near-boiling water with the angle of the position of superimposition—the switching angle for the reed switch, since the typical control cartridge shaft with only 20 splines allows a precision of 18 degrees rotation at best. It was convenient that the two raised sectors allowed space for embedment of the reed switch and magnet.

FIG. 4a also shows a position for a second embedded reed switch 121a for obtaining chilled water from an unpressurised tank; a likely situation. The second reed switch is oriented so as to active the related pump or other supply device 340a through wiring 122a and control or power supply circuit 123a when the handle 114 has been turned anticlockwise in the "chilled direction" far enough to bring the magnet 119 of FIG. 4b near to the second reed switch and also open the related ports in the control cartridge 105. The second reed switch and related apparatus would not be needed if the chilled water is held in a tank under pressure, as is common.

If plumbing regulations allow, a non-vented heated tank may be used. In that case a solenoid valve (not shown) may be used to admit water from the heated tank to the faucet. The current required to operate a solenoid valve exceeds the ratings of most reed switches so control circuits such as 123, 123a are retained.

According to the invention, the user is not prevented by the safety interlock from rotating cylinder 114 anticlockwise from a central "off" position over a partial turn causing the control cartridge to open and admit chilled water into the spout of the faucet apparatus, or closing it again. But the user cannot turn the cylinder toward the boiled-water direction (anticlockwise as seen from the lateral end) without first overcoming a collision between an adjacent radius of the raised sector of disk 117 and a like radius of the raised sector of disk 104. The raised sectors should have abrupt edges so that mere pressure will not result in superimposition. To proceed, the user also has to pull cylinder 114 laterally by about 4 mm, the height of the raised sectors, against pressure from spring 106 in order to lift raised sector 104b over raised sector 117a and allow the control handle 114 to continue to rotate to a superimposition position for which (a) the control cartridge 105 opens a waterway from the first, near-boiling water supply for delivery via tube connector 130 and tube 131 to the spout at 132, and (b) the actuator switch 121 is activated so bringing the near-boiling water up from the tank 303 or 303a.

Since the exterior of the cylinder 114 is smooth and polished and has (in one example) a diameter of 46 mm and a length of 40 mm this contrivance provides a relatively child-proof safety lock preventing access to the near-boiling water. A child may turn the cylinder anticlockwise to get a variable rate of delivery of chilled water, but would find it more difficult to grasp the cylinder and overcome the spring in order to be able to turn the cylinder clockwise. A naïve adult would not know about the action required to get near-boiling water. The double (mechanical plus electrical) safety interlock requires two conditions before near-boiling water can be pumped to the spout: the cylinder 114 must be turned sufficiently far, and also the actuator switch must be operated.

Options for this assembly include materials for parts 104 and 117, which is preferably an engineering plastics, or a moulded plastics such as a nylon, or PTFE. The actuator switch 121 (and 121a if used) is preferably a magnetically operated reed switch; options include a Hall-effect switch, a microswitch running over an annular, sculpted track, or a photosensitive apparatus. The switch is preferably "open" unless close to the magnet when it closes, although the opposite can be employed as a signal to the power supply circuitry in 123. Alternatives include an accelerometer chip or a mercury switch to detect the direction of gravity, though those options offer no clear advantage. It is desirable to maintain a long service life for the reed switch by using a low current through the switch and limiting any transients. The non-moving wiring 122 (and 122a if used) are taken from the or each switch to a control input on a circuit board (123, 123a) that supplies the electromagnetic devices (motor or solenoid) forming part of support apparatus adjacent the tap and most likely under a bench 306. For example, the circuit board may boost power and protect the proximity-sensitive reed switch with a mechanical relay, or a solid-state relay device such as a TRIAC if the pump motor uses AC mains, or may include a DC motor current supply controlled by current through switch 121 if the pump has a DC motor. Typical pumps are centrifugal pumps.

In some circumstances, such as if the faucet is in a public place such as a church hall and is unsupervised from time to time, availability of the signal wiring 122 outside the faucet body allows the signal to be interrupted by a security switch (not shown) such as a key-operated switch under the bench 306 so that no near-boiling water can be drawn out of the faucet.

In a minimal-protection or single safety interlock usage the electric switch may be dispensed with, if the near-boiling water is supplied under an effective pressure to the faucet 101, 200. The mechanical safety interlock remains in effect and near-boiling water cannot be admitted through the control cartridge 105 unless it has been rotated past the angle at which sector collision between 104b and 117a occurs, so that an open channel exists between the near-boiling supply and the output of the cartridge leading to the spout 103.

Example 2

Support apparatus, in FIGS. 3a and 3b, for the faucet of Examples 1 or 3.

In a minimum configuration as in FIG. 3a this apparatus maintains only one tank holding a vented body of water at a near-boiling temperature, available to a faucet 101 of Example 1 or 200 of Example 3. The support apparatus is provided for those cases where the near-boiling water shall, by official decree or regulation, or common sense, be stored in a vented tank 300 and drawn up for use with a motor-driven pump 340 only when required. This apparatus is typically located beneath a bench 306. This apparatus complements the inventive aspects of the faucet of Examples 1 or 3.

Faucet 101 (which may be faucet 200) is shown in FIG. 3a or in FIG. 3b as a symbolic valve. The water boiler (300) is preferably fed from a mains water supply through a level-responsive valve such as a float valve shown symbolically as valve 301 so that the amount of water within is limited. The pressure of the heated water inside the boiler is that of the atmosphere since open pipe 305, led to a waste drain (not shown) comprises a vent to the atmosphere, The water, even if boiling, is kept at substantially ambient pressure. A thermostat-regulated heating surface 303 inside the boiler heats the water to a near-boiling temperature of around 91° C. and incidentally tends to cause outgassing of any dissolved gas. 303 may for example be a resistive element, a gas heater, a heat exchanger, or a heat pump.

The double safety interlock previously described in this section assumes presence of an electrically driven actuator that will cause a flow of near-boiling water to be brought to the tap as part of the dual operation on a command through wiring 122 from a proximity switch 121 inside the tap. If a vented boiler is not used, the wiring 122 may drive a solenoid valve (not shown) that when energised and opened admits near-boiling water kept under a pressure to the tap 101.

A water chiller is usually supplied but may be optional, since some purchasers may not require chilled water. Since chilled water is not as potentially hazardous as near-boiling water it is usually held within a pressurised container (not shown) supplied by reticulated cold water at a pressure. In that event a second pump assembly (as 340a in FIG. 3b) to draw the chilled water is not required, although a solenoid control may be used.

In FIG. 3b a first tank 300a serves as a header or supply tank for a boiler 303a and also for a chiller tank 304 chilled by a heat pump (not shown) and supplied from the header tank through pipe 304a. This version employs a second reed switch (121a in FIG. 4a), wiring 122a to a second power buffer 123a, and a second electric pump 340a, to draw chilled water to the tap (here shown as 101' in order to simplify the drawing); the same apparatus may be used with tap 200 of Example 3.

Non-return valves may be included as appropriate to prevent backflow from the boiler or from the chiller. Water filters such as replaceable cartridges including but not limited to ion-exchange resins may be fitted to the support apparatus below the bench, as is known to those skilled in the art.

Example 3. Four-Input Mixer Faucet

Figure 2:
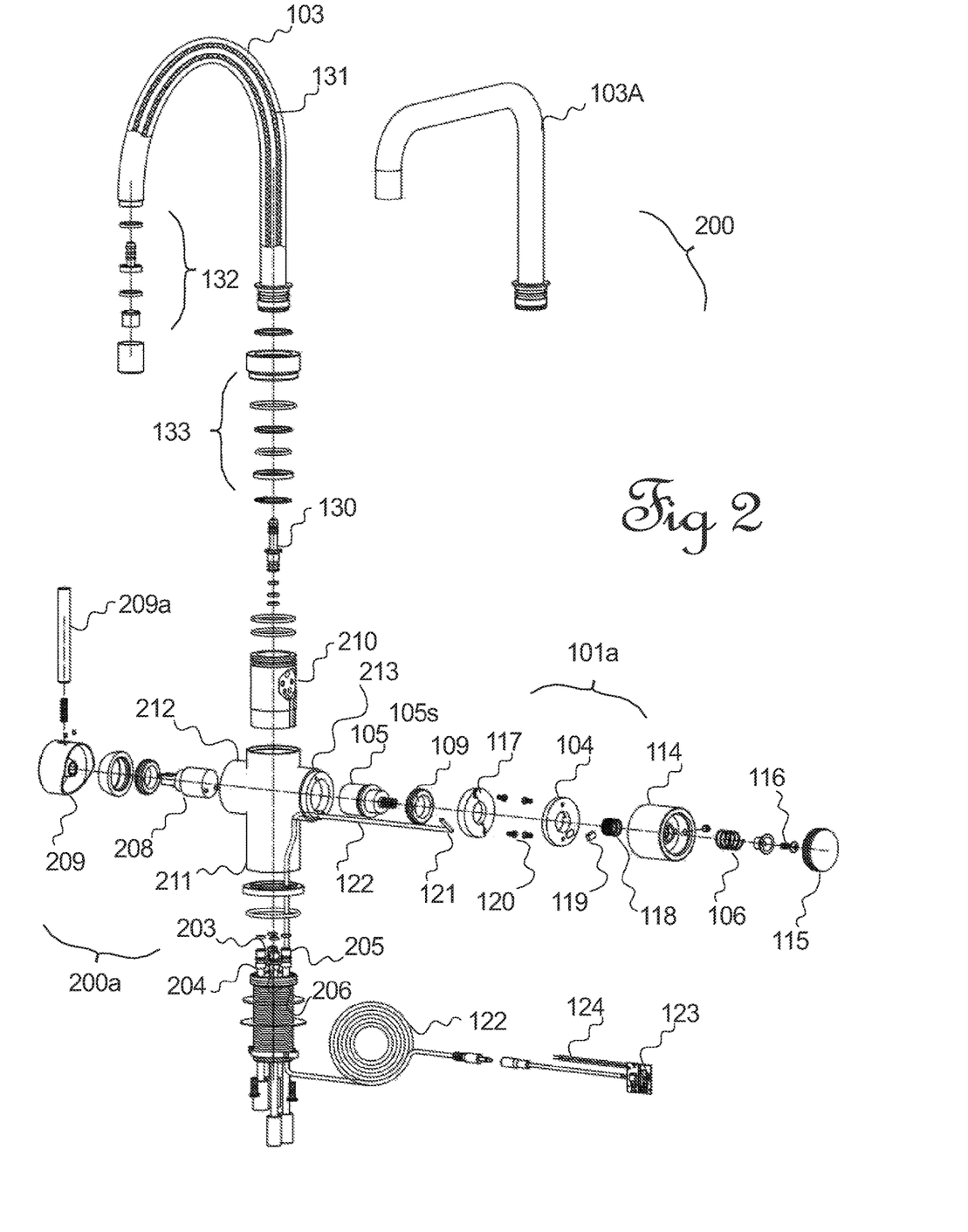
FIG. 2 is an exploded perspective view of a four-way tap like that of FIG. 1 also including a hot-mixed-cold mixer tap, according to a second embodiment of the present invention.

This faucet 200 includes the previously described two-stage safety interlock in an assembly 101a, and adds a second assembly 200a. The faucet is a convenient source of water at various temperatures for domestic use as from a conventional mixer, also providing near-boiling water under a safety interlock, and chilled water suitable for beverages. It is a combination of the Example 1 faucet and a conventional mixer faucet. For this Example, handle 209a for the mixer, and cylinder 114 and associated parts for the chilled or near-boiling water are operated independently of each other and the waters after leaving the cartridge 105, 208 converge into a common flow either inside spout 103 or at the aerator assembly 132. It was considered safer to retain a conventional control handle and operation for the mixer, since people would be familiar with that, while adopting a clearly different action for operation of the two-stage safety interlock mechanism.

FIG. 2 shows the four-way faucet 200 assembled around a single outer body 211 to be mounted on a horizontal surface such as a bench top 306. There are two side housings: 212 containing a mixer valve assembly 200a, and 213 containing a near-boiling type control valve and safety interlock assembly 200a, as previously described in this section. There are four inflow pipes and a single spout as shown as 103 in FIG. 1. Body 211 includes side housings 212 and 213. The mixer housing 212 encloses the second, conventional mixer control cartridge 208 and an end cap 209 supports the mixer control handle or lever 209a shown at the left end. That control handle is movable by rotation and by slope as is conventional for mixer faucets. No safety mechanism is provided, in this embodiment, around mixer control cartridge 208. It is assumed that the skilled reader needs no explanation of a conventional mixer faucet, and the reader is referred to the description in relation to FIGS. 1 and 3 for details of the near boiling or chilled delivery including a two-stage safety interlock mechanism.

Example 4. Selected Materials as Faucet Components for Improved Functionality In particular, a problem may arise in which a metal part of a faucet is heated to a dangerous temperature (in relation to skin contact) by passage of near-boiling water within.

Part 1:

There is a sealing disk in between the control cartridge and the faucet inner body, penetrated by ports at specified positions dictated by the layout of the control cartridge, each sealed by an annular seal. The inventor has found that use of a resilient material such as the conventional nitrile rubber cylinder as each annular seal for each water channel, along with an inner metal collar inside each seal in order to prevent the seals from collapsing inwardly, has not withstood the temperature of near-boiling water for a sufficient lifetime and boiling water may leak to lie underneath the faucet wall 102/213.

According to the invention, the annular seals are made of cylinders of PTFE plastics material, for which no internal metal collar is required. A heat-resistant nylon may be an alternative. It may be useful to make the entire sealing disk from a mass of PTFE or a nylon using a numerically controlled machining tool, or by a cold-moulding process in a mould as is well-known for PTFE.

Part 2:

Heat conducted through the metal body of the control cartridge and to the exterior of the tap body from the near-boiling water when in use may be blocked by a surrounding cylindrical mass of a plastics material, but in the current embodiment an air gap is substituted for the foam since the gap also includes wiring.

Part 3:

According to the invention the inner body or manifold 110, 210 is made of a plastics material as first described in '037. Preferred materials include without limitation PTFE or some nylons such as Nylon 6,6. Stability when hot, and significantly lower heat conductance than brass are obtained with the preferred PTFE. The inner body 110, 210 may be machined from a rod, or partly moulded and partly machined. It is provided with two or typically four threaded sockets 203, 204, 205 and 206 at a lower end for receiving threaded supply pipes (or another appropriate way to provide sound plumbing connections, as is known to those skilled in the art). Each socket is contiguous with a drilled channel passing along the cylinder, and intersecting with a side channel at a prescribed place for carrying water to an input port of a control or a mixing cartridge. Water leaving the cartridge passes back through a second side channel and into a delivery channel leading to the upper end of the inner body. The inner body is a tight fit inside the outer body 211, assisted by use of one or more O-rings inside grooves around the circumference of the inner body.

With regard to FIG. 3, normal hot and cold water reticulated supplies are connected to the inlets 203 and 204 and are passed out to a side port (obscured in FIG. 3) of the inner body 210 to be aligned with a sealing disk upon a median face of the standard control mixer 208.

Use of a plastics inner body prevents overheating of the faucet body during use. The inner body is a tight fit inside the outer body 211, assisted by use of one or more O-rings inside grooves around the circumference of the inner body.

Part 4:

Near-boiling water leaving the control cartridge is kept separate inside the inner body and is carried to a fitting capable of receiving a plastics tube 131 that carries the near-boiling 520 water inside the thermally insulating tube to the end of the spout 103, thus providing thermal insulation along the length of the spout, that may be assisted by a flow of water other than near-boiling between the wall of the spout and the inner plastics tube 131.

ADVANTAGES

1. The dual-input faucet 101 provides a convenient and safe supply of near-boiling water and alternatively chilled water for making up a beverage.
2. The four-input faucet 200 adds a second mixer control to provide conventional hot and cold, or mixed water at the same faucet.
3. The two-stage safety interlock mechanism has been constructed as an externally invisible addition inside an apparently conventional faucet.
4. The configuration of the cylinder control 114 and the requirement to move it axially as well as rotate it according to the two-stage safety interlock tends to prevent inadvertent delivery of near-boiling water especially by children.
5. Sequential operation of the cylinder, the switch, and the pump that draws water from the boiler delivers near-boiling water only after both conditions of a double safety interlock have been met.
6. Exteriorising part of the interlock, as wiring, also allows external monitoring and control of the delivery of near-boiling water.
7. The two-stage safety interlock previously described (parts 104, 117) helps protect users from contact with hot parts by not bringing the near-boiling water up and into the faucet until necessary.
8. Attention to thermal insulation as previously described in Example 4 prevents the faucet surfaces from becoming too hot and helps maintain the temperature of the near-boiling water.

I claim:

1. A safety interlock for a control shaft of a non-mixing control cartridge having a laterally directed axis with an inward or medial aspect toward a body of a faucet and an outward or lateral aspect away from the body,
   the safety interlock having a purpose of guarding delivery of a flow of water at a near-boiling temperature through the non-mixing control cartridge,
   the non-mixing control cartridge having an entry port and an exit port,
   the non-mixing control cartridge being coaxial with the laterally directed axis,
   the control shaft of the non-mixing control cartridge being a rotatable and laterally projecting control shaft provided with longitudinal splines and supporting a control handle, the control handle being a user-operated cylindrical handle rotatable and slidably movable with the longitudinal splines,
   the control handle being biased toward a medial direction by a biasing spring,
   the safety interlock comprising:
   a first disk, the first disk coaxially fixed against a lateral side of the non-mixing control cartridge, the first disk surrounding the control shaft and having a lateral disk surface including a raised first sector extending through a first arc and having abruptly raised ends;
   a second disk coaxially fixed against a medial surface of the control handle and having a medial disk surface including a raised second sector extending through a second arc and having abruptly raised ends,
   the first arc being greater than the second arc,
   said second disk having an internal splined aperture slidably supporting the control handle along the control shaft while maintaining engagement at a predetermined angular position around the control shaft,
   said second disk being biased toward the medial direction and maintaining slidable contact against the first disk,
   wherein the predetermined angular position provides that when the raised first sector and the raised second sector are in a superimposed position, the control shaft is at an angular position providing opened internal channels connecting the entry port of the non-mixing control cartridge designated for water at the near-boiling temperature to the exit port of the non-mixing control cartridge,
   wherein when in use the control shaft is prevented from rotation into the superimposed position by collision of adjacent ends of the first sector of the first disk and the second sector of the second disk, unless the user first pulls the control handle along the longitudinal splines of the control shaft laterally against the bias of the biasing spring, thereby separating the first and second disk and lifting an edge of the second sector over an edge of the first sector and then the user second turns the control handle by a further amount so that the superimposed position is reached.

2. The safety interlock as claimed in claim 1, wherein the first disk has a raised first sector extending through an arc of 180 degrees and the second disk has a raised second sector extending through an arc of 90 degrees.

3. The safety interlock as claimed in claim 1, wherein,
the laterally directed, raised sector of the first disk includes a first proximity switch responsive to a magnetic field, and
the medially directed, raised sector of the second disk includes a permanent magnet having a magnetic field effective on the first proximity switch so that, when in use, attainment of the superimposed position causes the first proximity switch to change state, thereby providing electrical sensing of the superimposed position.

4. A two-way bench-top faucet having a delivery spout and including the non-mixing control cartridge and the safety interlock as claimed in claim 3, the non-mixing control cartridge and the safety interlock being attached to the two-way bench-top faucet at a first side aperture,
the two-way bench-top faucet is supplied with a flow of water at the near-boiling temperature and with a flow of chilled water at respective connectors into channels of an inner faucet body or manifold for controllable delivery of water from the delivery spout mixed in any proportion by user control of the non-mixing control cartridge,
the control handle having
a first position, the first position being an "off" middle angular position in which the non-mixing control cartridge does not allow water to flow,
a second position, the second position being a "near-boiling" angular position reached by rotation of the control handle in a first direction, in which a first set of channels within the control cartridge connect between a source of water at the near-boiling temperature carried by the inner faucet body and the delivery spout, and
a third position, the third position being a "chilled" angular position reached by rotation of the control handle from the first position in an opposite direction, in which a second set of channels within the non-mixing control cartridge is connected between a source of chilled water carried by the inner faucet body and the delivery spout.

5. An apparatus in support of the bench-top faucet having the safety interlock as claimed in claim 4, wherein wiring from the first proximity switch is connected to a relay or supply circuit configured to provide electric power to an electrically driven device selected from the group consisting of pumps and solenoid-controlled valves configured for drawing or supplying a flow of water at the near-boiling temperature to the bench-top faucet from a container holding water maintained at the near-boiling temperature thereby preventing delivery of the water at the near-boiling temperature to the bench-top faucet unless (a) the first and second sectors of the first and second disks have been superimposed, and (b) as a result, the first proximity switch has changed state.

6. A two-way bench-top faucet as claimed in claim 4, further comprising wiring connected to the first proximity switch and an external security switch, wherein the wiring is interruptible by the external security switch as a safety precaution.

7. The two-way bench-top faucet including the safety interlock as claimed in claim 4, wherein the two-way bench-top faucet includes plastics materials, said plastics materials include use of PTFE as the inner faucet body, serving as thermal isolation for internal water channels that, when in use, contain water at the near-boiling temperature.

8. The two-way bench-top faucet including the safety interlock as claimed in claim 4, wherein the non-mixing control cartridge further comprises a perforated ceramic plate, and
wherein the two-way bench-top faucet further comprises cylindrical seals comprised of PTFE within a seal-carrying plate located in between the inner faucet body and the perforated ceramic plate within the non-mixing control cartridge.

9. A bench-top faucet having the safety interlock as claimed in claim 3, the bench-top faucet having a delivery spout, the safety interlock further comprising a second proximity switch responsive to the permanent magnet, the second proximity switch being located within the first disk and angularly disposed in order to change state when the hand control is a "chilled" position.

10. An apparatus in support of the bench-top faucet as claimed in claim 9, wherein wiring from the second proximity switch is connected to a relay or supply circuit configured to provide electric power to an electrically driven device selected from the group consisting of pumps and solenoid-controlled valves configured for drawing or supplying a flow of chilled water to the bench-top faucet from a container holding water maintained at a chilled temperature.

11. An apparatus in support of the bench-top faucet having the safety interlock as claimed in claim 9, wherein wiring from the first proximity switch is connected to a relay or supply circuit configured to provide electric power to an electrically driven device selected from the group consisting of pumps and solenoid-controlled valves configured for drawing or supplying a flow of water at the near-boiling temperature to the bench-top faucet from a container holding water maintained at the near-boiling temperature thereby preventing delivery of the water at the near-boiling temperature to the bench-top faucet unless (a) the first and second sectors of the first and second disks have been superimposed, and (b) as a result, the first proximity switch has changed state.

12. The bench-top faucet as claimed in claim 9, further comprising wiring connected to the first proximity switch and an external security switch, wherein the wiring is interruptible by the external security switch as a safety precaution.

13. The bench-top faucet including the safety interlock as claimed in claim 9, wherein the bench top faucet includes plastics materials, said plastics materials include use of PTFE as the inner faucet body, serving as thermal isolation for internal water channels that, when in use, contain water at the near boiling temperature.

14. The bench-top faucet having the safety interlock as claimed in claim 9, wherein,
the bench-top faucet is a four-way bench-top faucet,
the four-way bench-top faucet is supplied with a flow of water at the near-boiling temperature and a flow of chilled water and a flow of reticulated hot water and a flow of reticulated cold water,
the four-way bench-top faucet further comprising a hand-operated lever coupled to a mixer control cartridge, the mixer control cartridge attached to the four-way bench-top faucet at a side aperture configured for dispensing on demand from the delivery spout a mixed flow of reticulated hot and cold water, the mixed flow mixed in any proportion under control of the hand-operated lever,
the four-way bench-top faucet further comprising a four-way faucet body and a four-way inner faucet body including channels connecting the flow of reticulated hot water and the flow of reticulated cold water to the mixer control cartridge, said four-way inner faucet body also carrying a mixed output from the mixer control cartridge to the delivery spout.

15. An apparatus in support of the bench-top faucet having the safety interlock as claimed in claim 14, wherein wiring from the first proximity switch is connected to a relay or supply circuit configured to provide electric power to an electrically driven device selected from the group consisting of pumps and solenoid-controlled valves configured for drawing or supplying a flow of water at the near-boiling temperature to the bench-top faucet from a container holding water maintained at the near-boiling temperature thereby preventing delivery of the water at the near-boiling temperature to the bench-top faucet unless (a) the first and second sectors of the first and second disks have been superimposed, and (b) as a result, the first proximity switch has changed state.

16. An apparatus in support of the bench-top faucet as claimed in claim 14, wherein wiring from the second proximity switch is connected to a relay or supply circuit configured to provide electric power to an electrically driven device selected from the group consisting of pumps and solenoid-controlled valves configured for drawing or supplying a flow of chilled water to the bench-top faucet from a container holding water maintained at a chilled temperature.

17. The four-way bench-top faucet including the safety interlock as claimed in claim 14, wherein the non-mixing control cartridge further comprises a perforated ceramic plate, and wherein the four-way bench-top faucet further comprises cylindrical seals comprised of PTFE within a seal-carrying plate located in between the inner faucet body and the perforated ceramic plate within the non-mixing control cartridge.

18. A two-way bench-top faucet having a delivery spout and including the non-mixing control cartridge and the safety interlock as claimed in claim 3, the non-mixing control cartridge and the safety interlock being attached to the two-way bench-top faucet at a first side aperture, wherein, the two-way bench-top faucet is supplied with a flow of water at the near-boiling temperature and with a flow of chilled water at respective connectors into channels of an inner faucet body or manifold for controllable delivery of water of either temperature from the delivery spout under user control of the non-mixing control cartridge, the control handle has a first position, the first position being an "off" middle angular position in which the non-mixing control cartridge does not allow water to flow, a second position, the second position being a "near-boiling" angular position reached by rotation of the control handle in a first direction, in which a first set of channels within the control cartridge connect between a source of water at the near-boiling temperature carried by the inner faucet body and the delivery spout, and a third position, the third position being a "chilled" angular position reached by rotation of the control handle from the first position in an opposite direction, in which a second set of channels within the non-mixing control cartridge are connected between a source of chilled water carried by the inner faucet body and the delivery spout.

19. An apparatus in support of the two-way bench-top faucet having the safety interlock as claimed in claim 18, wherein wiring from the first proximity switch is connected to a relay or supply circuit configured to provide electric power to an electrically driven device selected from the group consisting of pumps and solenoid-controlled valves configured for drawing or supplying a flow of water at the near-boiling temperature to the bench-top faucet from a container holding water maintained at the near-boiling temperature thereby preventing delivery of the water at the near-boiling temperature to the bench-top faucet unless (a) the first and second sectors of the first and second disks have been superimposed, and (b) as a result, the first proximity switch has changed state.

* * * * *